US012551340B2

(12) United States Patent
Cohen et al.

(10) Patent No.: US 12,551,340 B2
(45) Date of Patent: Feb. 17, 2026

(54) PROSTHETIC VALVE DELIVERY ASSEMBLY

(71) Applicant: Edwards Lifesciences Corporation, Irvine, CA (US)

(72) Inventors: Oren Cohen, Kadima (IL); Ofir Witzman, Kfar Saba (IL); Elazar Levi Schwarcz, Netanya (IL)

(73) Assignee: EDWARDS LIFESCIENCES CORPORATION, Irvine, CA (US)

( * ) Notice: Subject to any disclaimer, the term of this patent is extended or adjusted under 35 U.S.C. 154(b) by 1045 days.

(21) Appl. No.: 17/242,517

(22) Filed: Apr. 28, 2021

(65) Prior Publication Data

US 2021/0244534 A1 Aug. 12, 2021

Related U.S. Application Data

(63) Continuation of application No. PCT/US2019/058359, filed on Oct. 28, 2019.
(Continued)

(51) Int. Cl.
*A61F 2/24* (2006.01)
*A61F 2/966* (2013.01)

(52) U.S. Cl.
CPC ............ *A61F 2/243* (2013.01); *A61F 2/2433* (2013.01); *A61F 2/2436* (2013.01); *A61F 2002/9665* (2013.01)

(58) Field of Classification Search
CPC ...... A61F 2/243; A61F 2/2433; A61F 2/2436; A61F 2002/9665; A61F 2220/0091;
(Continued)

(56) References Cited

U.S. PATENT DOCUMENTS 3,409,013 A 11/1968 Berry
3,548,417 A 12/1970 Kisher
(Continued)

FOREIGN PATENT DOCUMENTS

DE 0144167 C 9/1903
DE 2246526 A1 3/1973
(Continued)

OTHER PUBLICATIONS

De Buhr et al ("Impairment of pericardial leaflet structure from balloon-expanded valved stents", J Thorac Cardiovasc Surg 2012;143:1417-21). (Year: 2012).*

*Primary Examiner* — Melanie R Tyson
*Assistant Examiner* — Rebecca Lynee Zimmerman
(74) *Attorney, Agent, or Firm* — Klarquist Sparkman, LLP

(57) ABSTRACT

A prosthetic valve delivery assembly is disclosed. The assembly includes a delivery apparatus having a shaft and a prosthetic valve mounted in a radially compressed configuration around a distal portion of the shaft. The delivery apparatus further includes an expansion assist device mounted on the shaft. The expansion assist device is independently radially expandable and compressible relative to the prosthetic valve between a radially compressed state and a radially expanded state. The prosthetic valve is radially expandable by applying an axially directed force against the prosthetic valve in a proximal or distal direction through contact between the prosthetic valve and the expansion assist device when the expansion assist device is in the radially expanded state.

26 Claims, 8 Drawing Sheets

Related U.S. Application Data

(60) Provisional application No. 62/752,501, filed on Oct. 30, 2018.

(58) Field of Classification Search
CPC .................. A61F 2/2427; A61F 2/2439; A61F 2002/9511; A61F 2002/9534; A61F 2/95
See application file for complete search history.

(56) References Cited

U.S. PATENT DOCUMENTS

| | | |
|---|---|---|
| 3,587,115 A | 6/1971 | Shiley |
| 3,657,744 A | 4/1972 | Ersek |
| 3,671,979 A | 6/1972 | Moulopoulos |
| 3,714,671 A | 2/1973 | Edwards et al. |
| 3,755,823 A | 9/1973 | Hancock |
| 4,035,849 A | 7/1977 | Angell et al. |
| 4,056,854 A | 11/1977 | Boretos et al. |
| 4,106,129 A | 8/1978 | Carpentier et al. |
| 4,222,126 A | 9/1980 | Boretos et al. |
| 4,265,694 A | 5/1981 | Boretos et al. |
| 4,297,749 A | 11/1981 | Davis et al. |
| RE30,912 E | 4/1982 | Hancock |
| 4,339,831 A | 7/1982 | Johnson |
| 4,343,048 A | 8/1982 | Ross et al. |
| 4,345,340 A | 8/1982 | Rosen |
| 4,373,216 A | 2/1983 | Klawitter |
| 4,406,022 A | 9/1983 | Roy |
| 4,441,216 A | 4/1984 | Ionescu et al. |
| 4,470,157 A | 9/1984 | Love |
| 4,535,483 A | 8/1985 | Klawitter et al. |
| 4,574,803 A | 3/1986 | Storz |
| 4,592,340 A | 6/1986 | Boyles |
| 4,605,407 A | 8/1986 | Black et al. |
| 4,612,011 A | 9/1986 | Kautzky |
| 4,643,732 A | 2/1987 | Pietsch et al. |
| 4,655,771 A | 4/1987 | Wallsten |
| 4,692,164 A | 9/1987 | Dzemeshkevich et al. |
| 4,733,665 A | 3/1988 | Palmaz |
| 4,759,758 A | 7/1988 | Gabbay |
| 4,762,128 A | 8/1988 | Rosenbluth |
| 4,777,951 A | 10/1988 | Cribier et al. |
| 4,787,899 A | 11/1988 | Lazarus |
| 4,787,901 A | 11/1988 | Baykut |
| 4,796,629 A | 1/1989 | Grayzel |
| 4,820,299 A | 4/1989 | Philippe et al. |
| 4,829,990 A | 5/1989 | Thuroff et al. |
| 4,851,001 A | 7/1989 | Taheri |
| 4,856,516 A | 8/1989 | Hillstead |
| 4,878,495 A | 11/1989 | Grayzel |
| 4,878,906 A | 11/1989 | Lindemann et al. |
| 4,883,458 A | 11/1989 | Shiber |
| 4,922,905 A | 5/1990 | Strecker |
| 4,966,604 A | 10/1990 | Reiss |
| 4,979,939 A | 12/1990 | Shiber |
| 4,986,830 A | 1/1991 | Owens et al. |
| 4,994,077 A | 2/1991 | Dobben |
| 5,007,896 A | 4/1991 | Shiber |
| 5,026,366 A | 6/1991 | Leckrone |
| 5,032,128 A | 7/1991 | Alonso |
| 5,037,434 A | 8/1991 | Lane |
| 5,047,041 A | 9/1991 | Samuels |
| 5,059,177 A | 10/1991 | Towne et al. |
| 5,080,668 A | 1/1992 | Bolz et al. |
| 5,085,635 A | 2/1992 | Cragg |
| 5,089,015 A | 2/1992 | Ross |
| 5,152,771 A | 10/1992 | Sabbaghian et al. |
| 5,163,953 A | 11/1992 | Vince |
| 5,167,628 A | 12/1992 | Boyles |
| 5,192,297 A | 3/1993 | Hull |
| 5,266,073 A | 11/1993 | Wall |
| 5,282,847 A | 2/1994 | Trescony et al. |
| 5,295,958 A | 3/1994 | Shturman |
| 5,332,402 A | 7/1994 | Teitelbaum |
| 5,360,444 A | 11/1994 | Kusuhara |
| 5,370,685 A | 12/1994 | Stevens |
| 5,397,351 A | 3/1995 | Pavcnik et al. |
| 5,411,055 A | 5/1995 | Kane |
| 5,411,552 A | 5/1995 | Andersen et al. |
| 5,443,446 A | 8/1995 | Shturman |
| 5,480,424 A | 1/1996 | Cox |
| 5,500,014 A | 3/1996 | Quijano et al. |
| 5,545,209 A | 8/1996 | Roberts et al. |
| 5,545,214 A | 8/1996 | Stevens |
| 5,549,665 A | 8/1996 | Vesely et al. |
| 5,554,185 A | 9/1996 | Block et al. |
| 5,558,644 A | 9/1996 | Boyd et al. |
| 5,571,175 A | 11/1996 | Vanney et al. |
| 5,584,803 A | 12/1996 | Stevens et al. |
| 5,591,185 A | 1/1997 | Kilmer et al. |
| 5,591,195 A | 1/1997 | Taheri et al. |
| 5,607,464 A | 3/1997 | Trescony et al. |
| 5,609,626 A | 3/1997 | Quijano et al. |
| 5,628,792 A | 5/1997 | Lentell |
| 5,639,274 A | 6/1997 | Fischell et al. |
| 5,665,115 A | 9/1997 | Cragg |
| 5,716,417 A | 2/1998 | Girard et al. |
| 5,728,068 A | 3/1998 | Leone et al. |
| 5,749,890 A | 5/1998 | Shaknovich |
| 5,756,476 A | 5/1998 | Epstein et al. |
| 5,769,812 A | 6/1998 | Stevens et al. |
| 5,800,508 A | 9/1998 | Goicoechea et al. |
| 5,840,081 A | 11/1998 | Andersen et al. |
| 5,855,597 A | 1/1999 | Jayaraman |
| 5,855,601 A | 1/1999 | Bessler et al. |
| 5,855,602 A | 1/1999 | Angell |
| 5,925,063 A | 7/1999 | Khosravi |
| 5,957,949 A | 9/1999 | Leonhardt et al. |
| 6,027,525 A | 2/2000 | Suh et al. |
| 6,132,473 A | 10/2000 | Williams et al. |
| 6,168,614 B1 | 1/2001 | Andersen et al. |
| 6,171,335 B1 | 1/2001 | Wheatley et al. |
| 6,174,327 B1 | 1/2001 | Mertens et al. |
| 6,210,408 B1 | 4/2001 | Chandrasekaran et al. |
| 6,217,585 B1 | 4/2001 | Houser et al. |
| 6,221,091 B1 | 4/2001 | Khosravi |
| 6,231,602 B1 | 5/2001 | Carpentier et al. |
| 6,245,102 B1 | 6/2001 | Jayaraman |
| 6,299,637 B1 | 10/2001 | Shaolian et al. |
| 6,302,906 B1 | 10/2001 | Goicoechea et al. |
| 6,338,740 B1 | 1/2002 | Carpentier |
| 6,350,277 B1 | 2/2002 | Kocur |
| 6,352,547 B1 | 3/2002 | Brown et al. |
| 6,425,916 B1 | 7/2002 | Garrison et al. |
| 6,440,764 B1 | 8/2002 | Focht et al. |
| 6,454,799 B1 | 9/2002 | Schreck |
| 6,458,153 B1 | 10/2002 | Bailey et al. |
| 6,461,382 B1 | 10/2002 | Cao |
| 6,468,660 B2 | 10/2002 | Ogle et al. |
| 6,482,228 B1 | 11/2002 | Norred |
| 6,488,704 B1 | 12/2002 | Connelly et al. |
| 6,527,979 B2 | 3/2003 | Constantz et al. |
| 6,569,196 B1 | 5/2003 | Vesely |
| 6,582,462 B1 | 6/2003 | Andersen et al. |
| 6,605,112 B1 | 8/2003 | Moll et al. |
| 6,652,578 B2 | 11/2003 | Bailey et al. |
| 6,689,123 B2 | 2/2004 | Pinchasik |
| 6,716,244 B2 | 4/2004 | Klaco |
| 6,730,118 B2 | 5/2004 | Spenser et al. |
| 6,733,525 B2 | 5/2004 | Yang et al. |
| 6,767,362 B2 | 7/2004 | Schreck |
| 6,769,161 B2 | 8/2004 | Brown et al. |
| 6,783,542 B2 | 8/2004 | Eidenschink |
| 6,830,584 B1 | 12/2004 | Seguin |
| 6,878,162 B2 | 4/2005 | Bales et al. |
| 6,893,460 B2 | 5/2005 | Spenser et al. |
| 6,908,481 B2 | 6/2005 | Cribier |
| 6,936,067 B2 | 8/2005 | Buchanan |
| 7,018,406 B2 | 3/2006 | Seguin et al. |
| 7,018,408 B2 | 3/2006 | Bailey et al. |
| 7,096,554 B2 | 8/2006 | Austin et al. |
| 7,225,518 B2 | 6/2007 | Eidenschink et al. |
| 7,276,078 B2 | 10/2007 | Spenser et al. |
| 7,276,084 B2 | 10/2007 | Yang et al. |
| 7,316,710 B1 | 1/2008 | Cheng et al. |

(56) References Cited

U.S. PATENT DOCUMENTS

| | | | |
|---|---|---|---|
| 7,318,278 B2 | 1/2008 | Zhang et al. |
| 7,374,571 B2 | 5/2008 | Pease et al. |
| 7,393,360 B2 | 7/2008 | Spenser et al. |
| 7,462,191 B2 | 12/2008 | Spenser et al. |
| 7,510,575 B2 | 3/2009 | Spenser et al. |
| 7,563,280 B2 | 7/2009 | Anderson et al. |
| 7,585,321 B2 | 9/2009 | Cribier |
| 7,618,446 B2 | 11/2009 | Andersen et al. |
| 7,618,447 B2 | 11/2009 | Case et al. |
| 7,655,034 B2 | 2/2010 | Mitchell et al. |
| 7,785,366 B2 | 8/2010 | Maurer et al. |
| 7,959,665 B2 | 6/2011 | Pienknagura |
| 7,959,672 B2 | 6/2011 | Salahieh et al. |
| 7,993,394 B2 | 8/2011 | Hariton et al. |
| 8,029,556 B2 | 10/2011 | Rowe |
| 8,075,611 B2 | 12/2011 | Millwee et al. |
| 8,128,686 B2 | 3/2012 | Paul, Jr. et al. |
| 8,167,932 B2 | 5/2012 | Bourang et al. |
| 8,291,570 B2 | 10/2012 | Eidenschink et al. |
| 8,348,998 B2 | 1/2013 | Pintor et al. |
| 8,449,606 B2 | 5/2013 | Eliasen et al. |
| 8,454,685 B2 | 6/2013 | Hariton et al. |
| 8,652,203 B2 | 2/2014 | Quadri et al. |
| 8,685,055 B2 | 4/2014 | VanTassel et al. |
| 8,747,463 B2 | 6/2014 | Fogarty et al. |
| 9,078,781 B2 | 7/2015 | Ryan et al. |
| 2001/0021872 A1 | 9/2001 | Bailey et al. |
| 2002/0026094 A1 | 2/2002 | Roth |
| 2002/0032481 A1 | 3/2002 | Gabbay |
| 2002/0138135 A1 | 9/2002 | Duerig et al. |
| 2002/0143390 A1 | 10/2002 | Ishii |
| 2002/0173842 A1 | 11/2002 | Buchanan |
| 2003/0014105 A1 | 1/2003 | Cao |
| 2003/0040791 A1 | 2/2003 | Oktay |
| 2003/0050694 A1 | 3/2003 | Yang et al. |
| 2003/0100939 A1 | 5/2003 | Yodfat et al. |
| 2003/0158597 A1 | 8/2003 | Quiachon et al. |
| 2003/0212454 A1 | 11/2003 | Scott et al. |
| 2004/0024452 A1 | 2/2004 | Kruse et al. |
| 2004/0039436 A1 | 2/2004 | Spenser et al. |
| 2004/0078074 A1 | 4/2004 | Anderson et al. |
| 2004/0186558 A1 | 9/2004 | Pavcnik et al. |
| 2004/0186563 A1 | 9/2004 | Lobbi |
| 2004/0186565 A1 | 9/2004 | Schreck |
| 2004/0260389 A1 | 12/2004 | Case et al. |
| 2005/0010285 A1 | 1/2005 | Lambrecht et al. |
| 2005/0075725 A1 | 4/2005 | Rowe |
| 2005/0075728 A1 | 4/2005 | Nguyen et al. |
| 2005/0096736 A1 | 5/2005 | Osse et al. |
| 2005/0096738 A1 | 5/2005 | Cali et al. |
| 2005/0137686 A1 | 6/2005 | Salahieh et al. |
| 2005/0143809 A1* | 6/2005 | Salahieh ............... A61F 2/2418 623/2.11 |
| 2005/0188525 A1 | 9/2005 | Weber et al. |
| 2005/0203614 A1 | 9/2005 | Forster et al. |
| 2005/0203617 A1 | 9/2005 | Forster et al. |
| 2005/0234546 A1 | 10/2005 | Nugent et al. |
| 2005/0288766 A1* | 12/2005 | Plain ............... A61F 2/97 623/1.12 |
| 2006/0004469 A1 | 1/2006 | Sokel |
| 2006/0025857 A1 | 2/2006 | Bergheim et al. |
| 2006/0058872 A1 | 3/2006 | Salahieh et al. |
| 2006/0074484 A1 | 4/2006 | Huber |
| 2006/0108090 A1 | 5/2006 | Ederer et al. |
| 2006/0149350 A1 | 7/2006 | Patel et al. |
| 2006/0183383 A1 | 8/2006 | Asmus et al. |
| 2006/0229719 A1 | 10/2006 | Marquez et al. |
| 2006/0259136 A1 | 11/2006 | Nguyen et al. |
| 2006/0259137 A1 | 11/2006 | Artof et al. |
| 2006/0287717 A1 | 12/2006 | Rowe et al. |
| 2007/0005131 A1 | 1/2007 | Taylor |
| 2007/0010876 A1 | 1/2007 | Salahieh et al. |
| 2007/0010877 A1 | 1/2007 | Salahieh et al. |
| 2007/0088431 A1* | 4/2007 | Bourang ............... A61F 2/2436 623/2.11 |
| 2007/0112422 A1 | 5/2007 | Dehdashtian |
| 2007/0162102 A1 | 7/2007 | Ryan et al. |
| 2007/0203503 A1 | 8/2007 | Salahieh et al. |
| 2007/0203575 A1 | 8/2007 | Forster et al. |
| 2007/0203576 A1 | 8/2007 | Lee et al. |
| 2007/0208550 A1 | 9/2007 | Cao et al. |
| 2007/0213813 A1 | 9/2007 | Von Segesser et al. |
| 2007/0233228 A1 | 10/2007 | Eberhardt et al. |
| 2007/0260305 A1 | 11/2007 | Drews et al. |
| 2007/0265700 A1 | 11/2007 | Eliasen et al. |
| 2008/0021546 A1 | 1/2008 | Patz et al. |
| 2008/0114442 A1 | 5/2008 | Mitchell et al. |
| 2008/0125853 A1 | 5/2008 | Bailey et al. |
| 2008/0154355 A1 | 6/2008 | Benichou et al. |
| 2008/0183271 A1 | 7/2008 | Frawley et al. |
| 2008/0208327 A1 | 8/2008 | Rowe |
| 2008/0243245 A1 | 10/2008 | Thambar et al. |
| 2008/0255660 A1 | 10/2008 | Guyenot et al. |
| 2008/0275537 A1 | 11/2008 | Limon |
| 2008/0294248 A1 | 11/2008 | Yang et al. |
| 2009/0118826 A1 | 5/2009 | Khaghani |
| 2009/0125118 A1 | 5/2009 | Gong |
| 2009/0157175 A1 | 6/2009 | Benichou |
| 2009/0276040 A1 | 11/2009 | Rowe et al. |
| 2009/0281619 A1* | 11/2009 | Le ............... A61M 25/01 623/2.11 |
| 2009/0287296 A1 | 11/2009 | Manasse |
| 2009/0287299 A1 | 11/2009 | Tabor et al. |
| 2009/0299452 A1 | 12/2009 | Eidenschink et al. |
| 2009/0319037 A1 | 12/2009 | Rowe et al. |
| 2010/0004735 A1 | 1/2010 | Yang et al. |
| 2010/0049313 A1 | 2/2010 | Alon et al. |
| 2010/0082094 A1 | 4/2010 | Quadri et al. |
| 2010/0100176 A1 | 4/2010 | Elizondo et al. |
| 2010/0168844 A1 | 7/2010 | Toomes et al. |
| 2010/0185277 A1 | 7/2010 | Braido et al. |
| 2010/0198347 A1 | 8/2010 | Zakay et al. |
| 2010/0204781 A1 | 8/2010 | Alkhatib |
| 2011/0015729 A1 | 1/2011 | Jimenez et al. |
| 2011/0022157 A1 | 1/2011 | Essinger et al. |
| 2011/0066224 A1 | 3/2011 | White |
| 2011/0137397 A1 | 6/2011 | Chau et al. |
| 2011/0218619 A1 | 9/2011 | Benichou et al. |
| 2011/0319991 A1 | 12/2011 | Hariton et al. |
| 2012/0030090 A1 | 2/2012 | Johnston et al. |
| 2012/0089223 A1 | 4/2012 | Nguyen et al. |
| 2012/0101571 A1 | 4/2012 | Thambar et al. |
| 2012/0123529 A1 | 5/2012 | Levi et al. |
| 2012/0259409 A1 | 10/2012 | Nguyen et al. |
| 2013/0023985 A1 | 1/2013 | Khairkhahan et al. |
| 2013/0046373 A1 | 2/2013 | Cartledge et al. |
| 2013/0150956 A1 | 6/2013 | Yohanan et al. |
| 2013/0166017 A1 | 6/2013 | Cartledge et al. |
| 2013/0190857 A1 | 7/2013 | Mitra et al. |
| 2013/0274873 A1 | 10/2013 | Delaloye et al. |
| 2013/0310926 A1 | 11/2013 | Hariton |
| 2013/0317598 A1 | 11/2013 | Rowe et al. |
| 2013/0331929 A1 | 12/2013 | Mitra et al. |
| 2014/0194981 A1 | 7/2014 | Menk et al. |
| 2014/0200661 A1 | 7/2014 | Pintor et al. |
| 2014/0209238 A1 | 7/2014 | Bonyuet et al. |
| 2014/0222136 A1 | 8/2014 | Geist et al. |
| 2014/0277417 A1 | 9/2014 | Schraut et al. |
| 2014/0277419 A1 | 9/2014 | Garde et al. |
| 2014/0277424 A1 | 9/2014 | Oslund |
| 2014/0277563 A1 | 9/2014 | White |
| 2014/0296962 A1 | 10/2014 | Cartledge et al. |
| 2014/0330372 A1 | 11/2014 | Weston et al. |
| 2014/0343670 A1 | 11/2014 | Bakis et al. |
| 2014/0343671 A1 | 11/2014 | Yohanan et al. |
| 2014/0350667 A1 | 11/2014 | Braido et al. |
| 2015/0073545 A1 | 3/2015 | Braido |
| 2015/0073546 A1 | 3/2015 | Braido |
| 2015/0135506 A1 | 5/2015 | White |
| 2015/0157455 A1 | 6/2015 | Hoang et al. |
| 2016/0374802 A1 | 12/2016 | Levi et al. |
| 2017/0014229 A1 | 1/2017 | Nguyen-Thien-Nhon et al. |
| 2018/0028310 A1 | 2/2018 | Gurovich et al. |
| 2018/0153689 A1 | 6/2018 | Maimon et al. |

(56) References Cited

U.S. PATENT DOCUMENTS

| | | | |
|---|---|---|---|
| 2018/0325665 | A1 | 11/2018 | Gurovich et al. |
| 2018/0344456 | A1 | 12/2018 | Barash et al. |
| 2019/0159894 | A1 | 5/2019 | Levi et al. |
| 2019/0192288 | A1 | 6/2019 | Levi et al. |
| 2019/0192289 | A1 | 6/2019 | Levi et al. |

FOREIGN PATENT DOCUMENTS

| | | |
|---|---|---|
| DE | 19532846 A1 | 3/1997 |
| DE | 19546692 A1 | 6/1997 |
| DE | 19857887 A1 | 7/2000 |
| DE | 19907646 A1 | 8/2000 |
| DE | 10049812 A1 | 4/2002 |
| DE | 10049813 C1 | 4/2002 |
| DE | 10049815 A1 | 4/2002 |
| EP | 0103546 A1 | 3/1984 |
| EP | 0850607 A1 | 7/1998 |
| EP | 1088529 A2 | 4/2001 |
| EP | 1570809 A1 | 9/2005 |
| FR | 2788217 A1 | 7/2000 |
| FR | 2815844 A1 | 5/2002 |
| GB | 2056023 A | 3/1981 |
| PE | 10049814 A1 | 4/2002 |
| SU | 1271508 A1 | 11/1986 |
| WO | 9117720 A1 | 11/1991 |
| WO | 9217118 A1 | 10/1992 |
| WO | 9301768 A1 | 2/1993 |
| WO | 9724080 A1 | 7/1997 |
| WO | 9829057 A1 | 7/1998 |
| WO | 9930646 A1 | 6/1999 |
| WO | 9933414 A1 | 7/1999 |
| WO | 9940964 A1 | 8/1999 |
| WO | 9947075 A1 | 9/1999 |
| WO | 0018333 A1 | 4/2000 |
| WO | 0041652 A1 | 7/2000 |
| WO | 0135878 A2 | 5/2001 |
| WO | 0154624 A1 | 8/2001 |
| WO | 0162189 A1 | 8/2001 |
| WO | 0164137 A1 | 9/2001 |
| WO | 0176510 A2 | 10/2001 |
| WO | 0222054 | 3/2002 |
| WO | 0241789 A2 | 5/2002 |
| WO | D236048 A1 | 5/2002 |
| WO | 0243620 A1 | 6/2002 |
| WO | 0247575 A2 | 6/2002 |
| WO | 0249540 A2 | 6/2002 |
| WO | 2005034812 A1 | 4/2005 |
| WO | 2005055883 A1 | 6/2005 |
| WO | 2005084595 A1 | 9/2005 |
| WO | 2006014233 A2 | 2/2006 |
| WO | 2006032051 A2 | 3/2006 |
| WO | 2006034008 A2 | 3/2006 |
| WO | 2006111391 A1 | 10/2006 |
| WO | 2006127089 A1 | 11/2006 |
| WO | 2005102015 A3 | 4/2007 |
| WO | 2007047488 A2 | 4/2007 |
| WO | 2007067942 A1 | 6/2007 |
| WO | 2007097983 A2 | 8/2007 |
| WO | 2008005405 A2 | 1/2008 |
| WO | 2008015257 A2 | 2/2008 |
| WO | 2008035337 A2 | 3/2008 |
| WO | 2008147964 A1 | 12/2008 |
| WO | 2008150529 A1 | 12/2008 |
| WO | 2009033469 A1 | 3/2009 |
| WO | 2009042196 A2 | 4/2009 |
| WO | 2009053497 A1 | 4/2009 |
| WO | 2009061389 A2 | 5/2009 |
| WO | 2009094188 A2 | 7/2009 |
| WO | 2009116041 A2 | 9/2009 |
| WO | 2009149462 A2 | 12/2009 |
| WO | 2010011699 A2 | 1/2010 |
| WO | 2013106585 A1 | 7/2013 |
| WO | 2015085218 A1 | 6/2015 |

\* cited by examiner

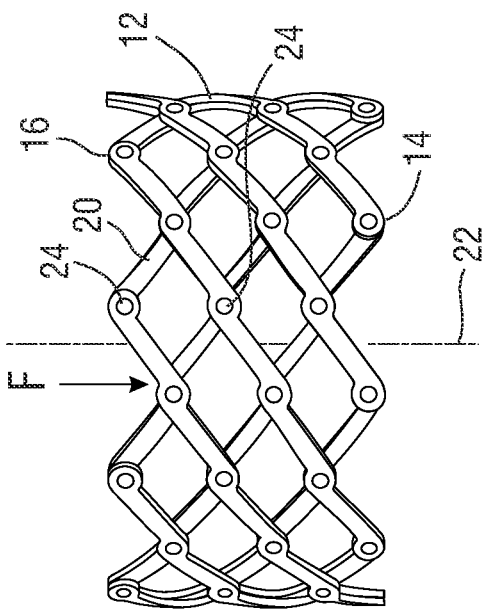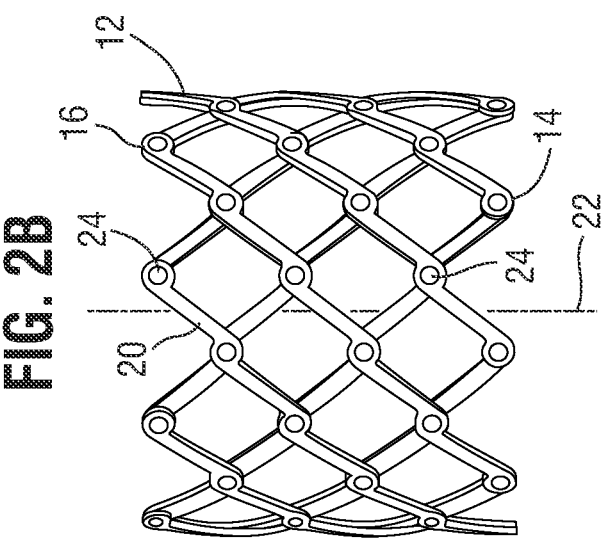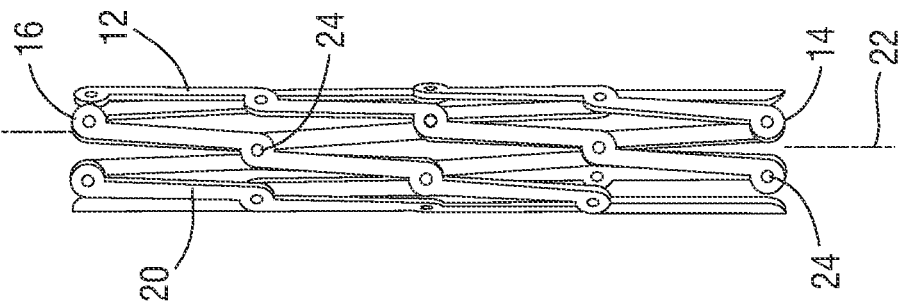

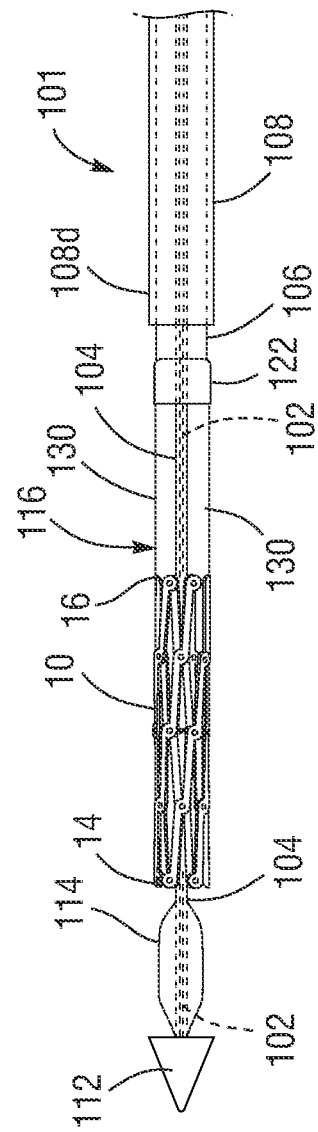
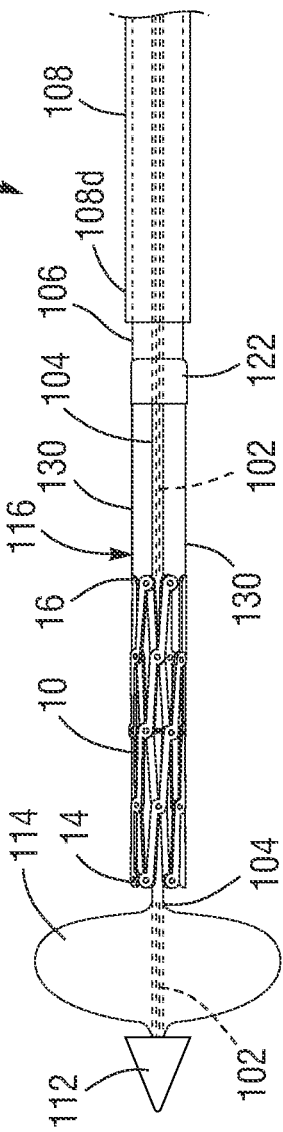

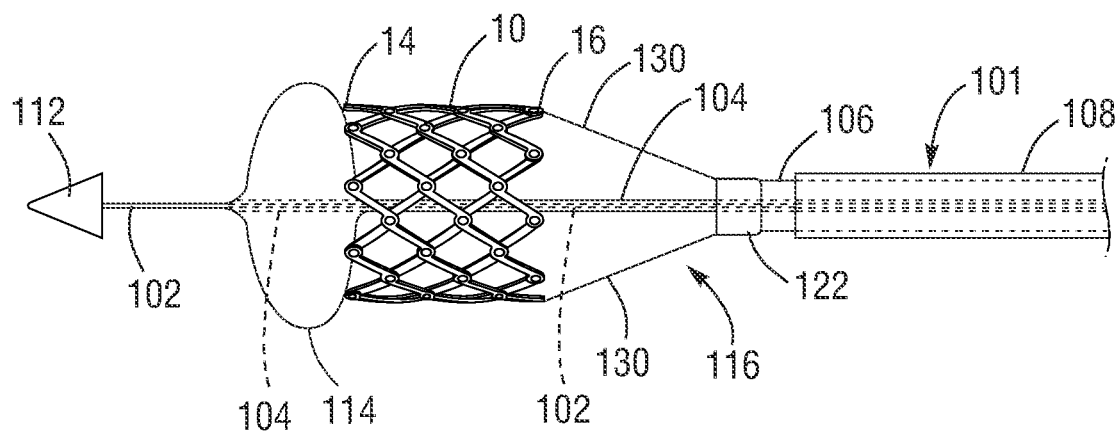
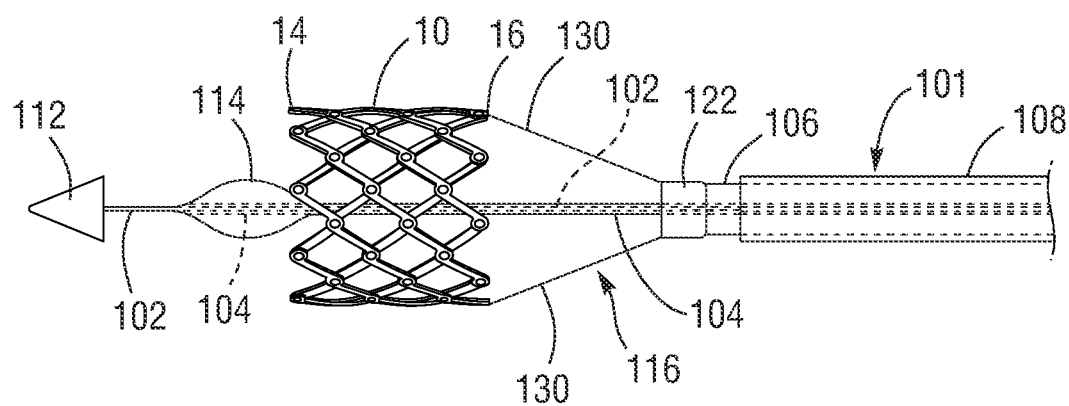

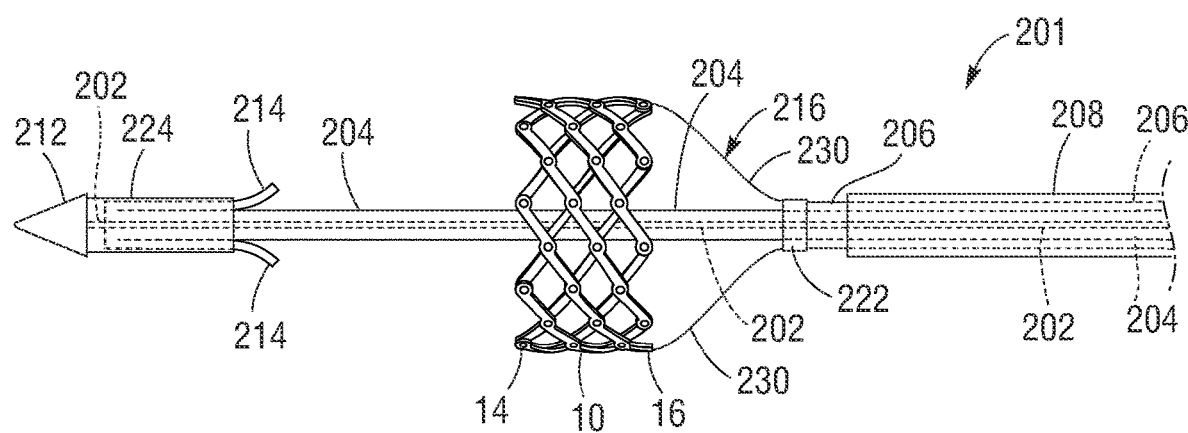

PROSTHETIC VALVE DELIVERY ASSEMBLY

CROSS-REFERENCE TO RELATED APPLICATION

This application is a continuation of International Application No. PCT/US2019/058359, filed Oct. 28, 2019, which claims the benefit of U.S. Provisional Application No. 62/752,501, filed Oct. 30, 2018. The entirety of each of the foregoing applications is hereby incorporated herein by reference.

FIELD

The present disclosure concerns embodiments of prosthetic valve delivery assemblies and related methods.

BACKGROUND

Endovascular delivery devices are used in various procedures to deliver prosthetic medical devices or instruments to locations inside the body that are not readily accessible by surgery or where access without surgery is desirable. Access to a target location inside the body can be achieved by inserting and guiding the delivery device through a pathway or lumen in the body, including, but not limited to, a blood vessel, an esophagus, a trachea, any portion of the gastrointestinal tract, a lymphatic vessel, to name a few. In one specific example, a prosthetic heart valve can be mounted in a crimped state on the distal end of a delivery device and advanced through the patient's vasculature (e.g., through a femoral artery and the aorta) until the prosthetic valve reaches the implantation site in the heart. The prosthetic valve is then expanded to its functional size, for example, by inflating a balloon on which the prosthetic valve is mounted, or by deploying the prosthetic valve from a sheath of the delivery device so that the prosthetic valve can self-expand to its functional size. Despite the recent advancements in percutaneous valve technology, there remains a need for improved systems and methods for delivery of such valves.

SUMMARY

Disclosed herein are prosthetic valve delivery assemblies and related methods, which can be used to deliver a prosthetic valve to a location within a body of a subject. In some implementations, the prosthetic valve delivery assemblies can be used to deliver a medical device through the vasculature, such as to a heart of the subject.

Certain embodiments of the disclosure concern a prosthetic valve delivery assembly. The assembly can include a delivery apparatus having a shaft and a prosthetic valve mounted in a radially compressed configuration around a distal portion of the shaft. The delivery apparatus can further include an expansion assist device mounted on the shaft. The expansion assist device can be independently radially expandable and compressible relative to the prosthetic valve between a radially compressed state and a radially expanded state. The prosthetic valve can be radially expandable by applying an axially directed force against the prosthetic valve in a proximal or distal direction through contact between the prosthetic valve and the expansion assist device when the expansion assist device is in the radially expanded state.

In some embodiments, the delivery apparatus can further include a valve-retaining device releasably connected to the prosthetic valve.

In some embodiments, the valve-retaining device can be positioned proximal to the prosthetic valve, and the expansion assist device can be positioned distal to the prosthetic valve.

In some embodiments, the valve-retaining device can include one or more radially expandable support members releasably connected to a proximal end of the prosthetic valve.

In some embodiments, the expansion assist device can include an inflatable balloon mounted on the shaft. At least a portion of the balloon, when inflated, can have a diameter that is larger than a diameter of the prosthetic valve when the prosthetic valve is radially expanded.

In some embodiments, the expansion assist device can include one or more self-expandable arms defining a diameter that is larger than a diameter of the prosthetic valve when the prosthetic valve is radially expanded.

In some embodiments, the delivery apparatus can include a cover sheath configured to extend over the one or more self-expandable arms so as to stow the one or more self-expandable arms in a compressed configuration.

In some embodiments, the cover sheath can be axially moveable relative to the one or more self-expandable arms such that moving the cover sheath distally relative to the arms causes at least a proximal portion of each arm to extend outside the cover sheath and self-expand to an expanded configuration.

In some embodiments, when the expansion assist device is in the radially expanded state, moving the expansion assist device proximally can cause the expansion assist device to be urged against a distal end of the prosthetic valve to produce radial expansion of the prosthetic valve.

In some embodiments, the valve-retaining device can be axially moveable relative to the shaft. Moving the valve-retaining device distally while the expansion assist device is in the radially expanded state can push the prosthetic valve distally against the expansion assist device to produce radial expansion of the prosthetic valve.

Certain embodiments of the disclosure concern also concern a prosthetic valve delivery assembly including a delivery apparatus having a shaft and a prosthetic valve mounted in a radially compressed configuration around a distal portion of the shaft. The delivery apparatus can also include an expansion assist device mounted on the shaft, wherein the expansion assist device is unconnected to the prosthetic valve. Further, the expansion assist device and the prosthetic valve can be axially moveable relative to each other. The expansion assist device can be radially expandable and compressible between a radially compressed state and a radially expanded state, and the prosthetic valve can be radially expandable by applying an axially directed force against the prosthetic valve in a proximal or distal direction through contact between the prosthetic valve and the expansion assist device when the expansion assist device is in the radially expanded state.

In some embodiments, the expansion and compression of the expansion assist device can be independent of the expansion and compression of the prosthetic valve.

In some embodiments, the delivery apparatus can further include a valve-retaining device releasably connected to the prosthetic valve.

In some embodiments, the valve-retaining device can be positioned proximal to the prosthetic valve, and the expansion assist device can be positioned distal to the prosthetic valve.

In some embodiments, the valve-retaining device can be positioned distal to the prosthetic valve, and the expansion assist device can be positioned proximal to the prosthetic valve.

In some embodiments, the expansion assist device can include an inflatable balloon mounted on the shaft. At least a portion of the balloon, when inflated, can have a diameter that is larger than a diameter of the prosthetic valve when the prosthetic valve is radially expanded.

In some embodiments, the expansion assist device can include one or more self-expandable arms. The self-expandable arms, when expanded, can define a diameter that is larger than a diameter of the prosthetic valve when the prosthetic valve is radially expanded.

In some embodiments, the expansion assist device can include a cover sheath configured to extend over the one or more self-expandable arms so as to stow the one or more self-expandable arms in a compressed configuration.

In some embodiments, the cover sheath can be axially moveable relative to the one or more self-expandable arms such that moving the cover sheath axially relative to the arms causes at least a portion of each of the arms to extend outside the cover sheath and self-expand to an expanded configuration.

Also disclosed herein are methods of expanding a prosthetic valve mounted in a radially compressed configuration around a shaft of a delivery apparatus. The method can include expanding an expansion assist device mounted on the shaft from a radially compressed state to a radially expanded state, and after expanding the expansion assist device, applying an axial force against the prosthetic valve in a proximal or distal direction through contact between the prosthetic valve and the expanded expansion assist device, thereby causing the prosthetic valve to radially expand from the radially compressed configuration to a radially expanded configuration.

In some embodiments, the expansion assist device can be initially axially spaced from the prosthetic valve. In certain embodiments, the method can further include the act of bringing the expansion assist device into contact with the prosthetic valve after the act of expanding the expansion assist device.

In some embodiments, the act of bringing the expansion assist device into contact with the prosthetic valve can include moving the prosthetic device axially toward the expansion assist device.

In some embodiments, the act of bringing the expansion assist device into contact with the prosthetic valve can include moving the expansion assist device axially toward the prosthetic device.

In some embodiments, the expansion assist device can include an inflatable balloon. In certain embodiments, the act of expanding the expansion assist device can include inflating the inflatable balloon.

In some embodiments, the expansion assist device can include one or more self-expandable arms. In certain embodiments, the act of expanding the expansion assist device can include deploying at least a portion of each arm from a sheath so as to allow the portion of each arm to self-expand.

In some embodiments, the act of applying an axial force against the prosthetic valve can include moving the expanded expansion assist device in a proximal direction against a distal end of the prosthetic valve.

In some embodiments, the act of applying an axial force against the prosthetic valve can include moving a valve-retaining device connected to a proximal end of the prosthetic valve in a distal direction against the expanded expansion assist device.

The foregoing and other objects, features, and advantages of the invention will become more apparent from the following detailed description, which proceeds with reference to the accompanying figures.

BRIEF DESCRIPTION OF THE DRAWINGS

FIG. 2A shows the frame of the prosthetic valve of FIG. 1 shown in a radially compressed configuration.

FIG. 2B shows the frame of the prosthetic valve of FIG. 1 shown in a partially radially expanded configuration.

FIG. 2C shows the frame of the prosthetic valve of FIG. 1 shown in a fully radially expanded configuration.

FIG. 4 shows the prosthetic valve delivery assembly depicted in FIG. 3 after the balloon and the prosthetic valve have been advanced from the outer sheath.

FIG. 5 shows the prosthetic valve delivery assembly depicted in FIG. 3 after the balloon has been inflated.

FIG. 6 shows the prosthetic valve delivery assembly depicted in FIG. 3 after the inflated balloon is urged against the prosthetic valve, causing the prosthetic valve to radially expand.

FIG. 7 shows the prosthetic valve delivery assembly depicted in FIG. 3 after the balloon is deflated following expansion of the prosthetic valve.

FIG. 12 shows the prosthetic valve delivery assembly depicted in FIG. 8 with the expansion assist device being recaptured by the cover sheath following expansion of the prosthetic valve.

DETAILED DESCRIPTION

Described herein are examples of prosthetic implant delivery assemblies and related methods which can improve a physician's ability to control the size of a mechanically-expandable prosthetic implant, such as prosthetic valves (e.g., prosthetic heart valves or venous valves), stents, or grafts, as well as facilitate separation of the prosthetic implant from the delivery assembly, during the implantation procedure. Prosthetic heart valves disclosed herein can be implanted within any of the native valves of the heart (the aortic, mitral, tricuspid and pulmonary valves).

Prosthetic valves disclosed herein can be radially compressible and expandable between a radially compressed configuration and a radially expanded configuration. Thus, the prosthetic valves can be crimped on an implant delivery apparatus in the radially compressed configuration during delivery, and then expanded to the radially expanded configuration once the prosthetic valve reaches the implantation site.

Figure 1:
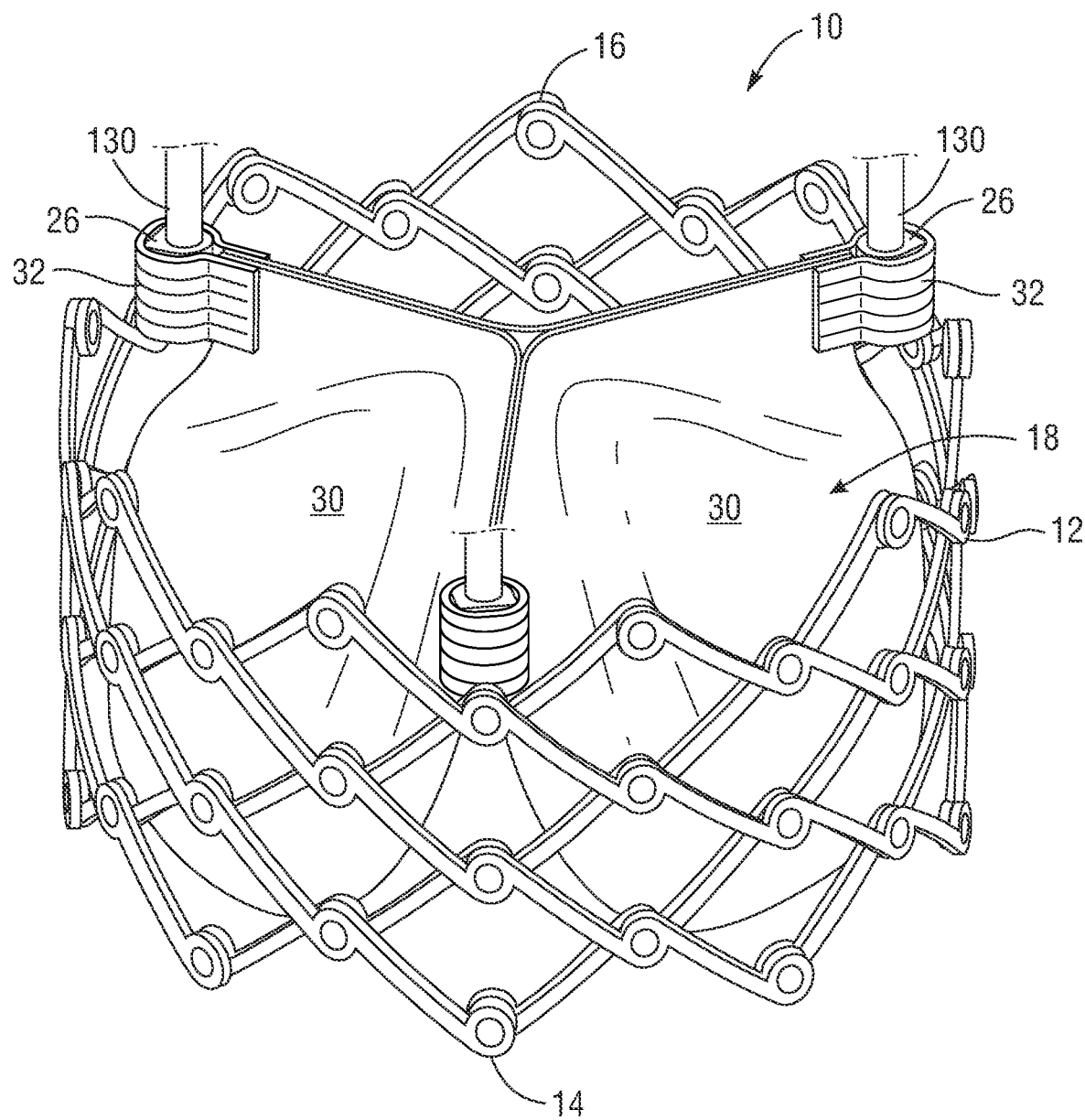
FIG. 1 is a perspective view of a prosthetic valve, according to one embodiment.

FIG. 1 shows an exemplary prosthetic valve 10, according to one embodiment. In particular embodiments, the prosthetic valve 10 can be implanted within the native aortic annulus, although it also can be implanted at other locations in the heart, including within the native mitral valve, the native pulmonary valve, and the native tricuspid valve. The prosthetic valve 10 can include an annular stent or frame 12 having a first end 14 and a second end 16. In the depicted embodiments, the first end 14 is an inflow end and the second end 16 is an outflow end. In other embodiments, the first end 14 can be an outflow end and the second end 16 can be the inflow end. The prosthetic valve 10 can also include a valvular structure 18 which is coupled to the frame 12 and configured to regulate the flow of blood through the prosthetic valve 10 from the inflow end to the outflow end. The prosthetic valve 10 can further include a plurality of coupling members 26 mounted to and equally spaced around the inner surface of the frame. Each of the coupling members 26 can be configured to form a releasable connection with a respective support member 130 of a delivery apparatus, as further described below.

The valvular structure 18 can include, for example, a leaflet assembly comprising one or more leaflets 30 made of a flexible material. The leaflets 30 of the leaflet assembly can be made from in whole or part, biological material, biocompatible synthetic materials, or other such materials. Suitable biological material can include, for example, bovine pericardium (or pericardium from other sources). The leaflets 30 can be arranged to form commissures 32, which can be, for example, mounted to respective coupling members 26. Further details regarding transcatheter prosthetic heart valves, including the manner in which the valvular structure can be coupled to the frame 12 of the prosthetic valve 10, can be found, for example, in U.S. Pat. Nos. 6,730,118, 7,393,360, 7,510,575, 7,993,394, and 8,652,202, and U.S. Patent Application Publication No. U.S. 2018/0325665, all of which are incorporated herein by reference in their entireties.

Although not shown, the prosthetic valve 10 can also include one or more skirts or sealing members. For example, the prosthetic valve 10 can include an inner skirt mounted on the inner surface of the frame. The inner skirt can function as a sealing member to prevent or decrease perivalvular leakage, to anchor the leaflets 30 to the frame, and/or to protect the leaflets against damage caused by contact with the frame during crimping and during working cycles of the prosthetic valve. The prosthetic valve 10 can also include an outer skirt mounted on the outer surface of the frame 12. The outer skirt can function as a sealing member for the prosthetic valve by sealing against the tissue of the native valve annulus and helping to reduce paravalvular leakage past the prosthetic valve. The inner and outer skirts can be formed from any of various suitable biocompatible materials, including any of various synthetic materials (e.g., PET) or natural tissue (e.g., pericardial tissue).

The prosthetic valve 10 can be radially compressible and expandable between a radially compressed configuration and a radially expanded configuration. FIGS. 2A-2C show the bare frame 12 of the prosthetic valve (without the leaflets and other components) for purposes of illustrating expansion of the prosthetic valve from the radially compressed configuration to the radially expanded configuration. FIG. 2A shows the frame 12 in the radially compressed configuration, FIG. 2B shows the frame 12 in a partially expanded configuration, and FIG. 2C shows the frame 12 in the fully radially expanded configuration. The prosthetic valve 10 in the illustrated configuration can be radially expanded by maintaining the first end 14 of the frame 12 at a fixed position while applying a force (F) in the axial direction against the second end 16 toward the first end 14. Alternatively, the prosthetic valve can be expanded by applying an axial force against the first end 14 while maintaining the second end 16 at a fixed position, or by applying opposing axial forces to the first and second ends 14, 16, respectively.

The frame 12 can be made of any of various suitable materials, such as stainless steel or a nickel titanium alloy ("NiTi"), for example Nitinol. As shown, the frame 12 can include a plurality of interconnected struts 20 arranged in a lattice-type pattern. The struts 20 are shown as positioned diagonally, or offset at an angle relative to, and radially offset from, a longitudinal axis 22 of the prosthetic valve 10 when the prosthetic valve 10 is in the expanded configuration. In other implementations, the struts 20 can be offset by a different amount than depicted in FIGS. 2B and 2C, or some or all of the struts 20 can be positioned parallel to the longitudinal axis of the prosthetic valve 10.

In the illustrated embodiment, the struts 20 are pivotably coupled to one another at one or more pivot joints along the length of each strut. For example, in the illustrated configuration, each of the struts 20 can be formed with apertures at opposing ends of the strut and apertures spaced along the length of the strut. Respective hinges can be formed at the locations where struts 20 overlap each other via fasteners, such as rivets or pins 24 that extend through the apertures. The hinges can allow the struts 20 to pivot relative to one another as the frame 12 is radially expanded or compressed, such as during assembly, preparation, or implantation of the prosthetic valve 10.

In some embodiments, the frame 12 can be constructed by forming individual components (e.g., the struts and fasteners of the frame) and then mechanically assembling and connecting the individual components together. In other embodiments, the struts 20 are not coupled to each other with respective hinges but are otherwise pivotable or bendable relative to each other to permit radial expansion and contraction of the frame 12. For example, the frame 12 can be formed (e.g., via laser cutting, electroforming or physical vapor deposition) from a single piece of material (e.g., a metal tube). Further details regarding the construction of the frame and the prosthetic valve are described in U.S. Patent Application Publication Nos. U.S. 2018/0153689, U.S. 2018/0344456, and U.S. 2019/0060057, and U.S. Application No. 62/799,678, filed Jan. 31, 2019, all of which are incorporated herein by reference. Additional examples of expandable prosthetic valves that can be used with the delivery apparatuses disclosed herein are described in U.S. Publication Nos. 2015/0135506 and 2014/0296962, which are incorporated herein by reference.

Exemplary systems and methods of using an expansion assist device to expand the prosthetic valve 10 will now be described. The prosthetic valve 10 can be manipulated into a radially compressed configuration (see, e.g., FIGS. 3-5 and 8-10) and inserted via a delivery apparatus into a patient for implantation. Once inside the body, the prosthetic valve 10 can be manipulated into a radially expanded configuration (see, e.g., FIGS. 6-7 and 11-12) and then released from the delivery apparatus inside the patient's body.

FIGS. 3-7 illustrate a prosthetic valve delivery assembly 100 and a related method of expanding the prosthetic valve 10, according to one embodiment. As shown, the delivery assembly 100 can include the prosthetic valve 10 and a delivery apparatus 101. The prosthetic valve 10 can be mounted in a radially compressed configuration around a distal end portion of the delivery apparatus 101 for insertion into a patient's body. In some embodiments, the prosthetic valve 10 can be oriented so that the outflow end 16 is positioned proximally relative to the inflow end 14. In this orientation, the prosthetic valve 10 can be advanced through the patient's vasculature in a retrograde approach (e.g., through a femoral artery and the aorta) to the heart for implantation at the native aortic valve. In other embodiments, the prosthetic valve 10 can be oriented so that the inflow end 14 is positioned proximally relative to the outflow end 16, depending on the particular delivery approach used and the implantation location for the prosthetic valve 10.

The delivery apparatus 101 in the illustrated embodiment includes a first shaft 102, a second shaft 104 extending co-axially over the first shaft 104, a third shaft 106 extending co-axially over the second shaft 104, and a fourth shaft 108 extending co-axially over the third shaft 106. The first shaft 102 is the inner-most shaft in the illustrated embodiment and can be referred to as the inner shaft of the delivery apparatus 101. Likewise, the fourth shaft 108 is the outer-most shaft in the illustrated embodiment and can be referred to as the outer shaft or outer sheath of the delivery apparatus 101. The shafts 102, 104, 106, and 108 can be axially and/or rotationally moveable relative to each other.

The delivery apparatus 101 can include a nose cone 112 connected to a distal end of the inner shaft 102. A guide wire (not shown) can extend through a central lumen of the inner shaft 102 and an inner lumen of the nose cone 112, so that the delivery apparatus 101 can be advanced over the guide wire inside the patient's vasculature.

The delivery apparatus 101 can include a handle 110 at a proximal end thereof. The proximal ends of the shafts 102, 104, 106, and 108 can be coupled to the handle. During delivery of the prosthetic valve 10, the handle 110 can be maneuvered by a surgeon to advance and retract the delivery apparatus 101 through the patient's vasculature. In some embodiments, the handle 110 can include a plurality of knobs or other actuating mechanisms for controlling different components of the delivery assembly 100 in order to expand and/or deploy the prosthetic valve 10. For example, the handle 110 can include one or more knobs or other actuating mechanisms, each configured to produce relative axial and/or rotational movement of a selected shaft 102, 104, 106, or 108 relative to the others.

Figure 3:
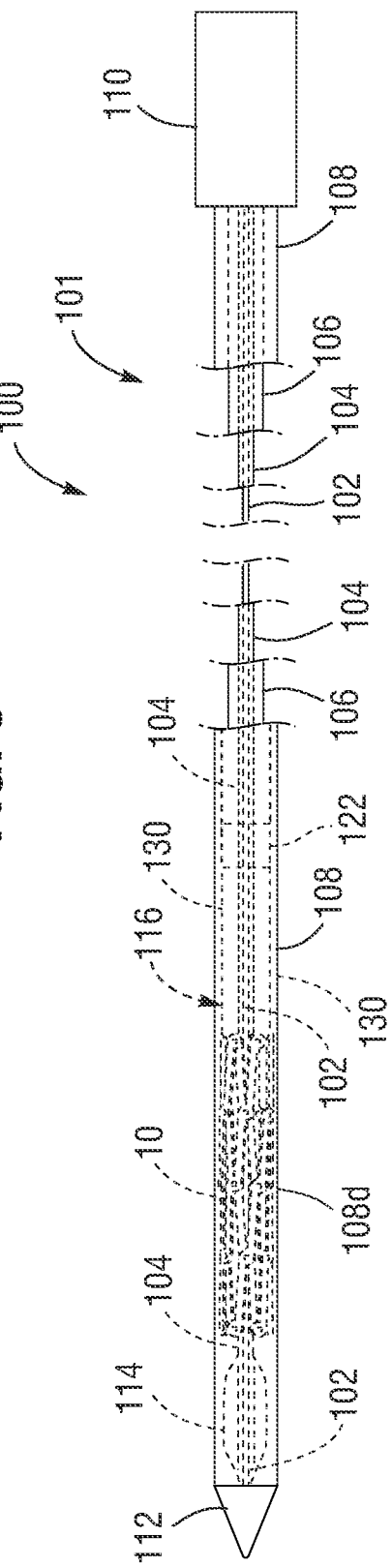
FIG. 3 shows a side elevation view of a prosthetic valve delivery assembly including an inflatable balloon and a compressed prosthetic valve, according to one embodiment, wherein the balloon is deflated and both the balloon and the prosthetic valve are retained within an outer sheath.

As shown in FIG. 3, a distal end portion 108d of the outer sheath 108 can extend over the prosthetic valve 10 and contact the nose cone 112 in the delivery configuration of the delivery apparatus 101. Thus, the distal end portion 108d of the outer sheath 108 can serve as a delivery capsule that contains or houses the prosthetic valve 10 in the radially compressed configuration for delivery through the patient's vasculature. The outer sheath 108 and the inner shaft 102 can be configured to be axially moveable relative to each other such that proximal movement of the outer sheath 108 relative to the inner shaft 102 (or a distal movement of the inner shaft 102 relative to the outer sheath 108) can expose the prosthetic valve 10 from the outer sheath 108. In alternative embodiments, the prosthetic valve 10 need not be housed within the outer sheath 108 during delivery. As such, in some embodiments, the delivery apparatus 101 does not include the outer sheath 108.

The delivery apparatus 101 can further include an expansion assist device that can be used to expand the prosthetic valve 10. The expansion assist device can be radially expandable and compressible between a radially compressed state and a radially expanded state. Further, the expansion and compression of the expansion assist device can be independent of the expansion and compression of the prosthetic valve 10. The expansion assist device desirably is unconnected to the prosthetic valve 10 to facilitate independent expansion of the expansion assist device relative to the prosthetic valve 10. As described more fully below, the prosthetic valve 10 can be radially expanded by urging the prosthetic valve 10 against the expansion assist device in an axial direction when the expansion assist device is in the radially expanded state.

In the embodiment of FIGS. 3-7, the expansion assist device comprises an inflatable balloon 114. The balloon 114 can be mounted on the distal end portion of the second shaft 104 proximal to the nose cone 112. Since the balloon 114 and the nose cone 112 are connected to separate shafts, the nose cone 112 and the balloon 114 can be moved axially relative to each other during the implantation procedure. In alternative embodiments, the balloon 114 can be mounted on the distal end portion of the inner shaft 102, and the delivery apparatus 101 need not include the shaft 104.

The distal end portion 108d of the outer sheath 108 can also extend over the balloon 114 in the delivery configuration of the delivery apparatus 101. In the embodiment depicted in FIG. 3, the radially compressed prosthetic valve 10 is mounted around the shaft 104 and the balloon 114 is positioned distal to the prosthetic valve 10. As further shown in FIG. 3, the radially compressed prosthetic valve 10 can be axially spaced from the adjacent end of the balloon 114 when the delivery apparatus 101 is in the delivery configuration.

In other embodiments (not shown), the balloon 114 can be initially positioned inside the radially compressed prosthetic valve 10 in the delivery configuration. In other words, the prosthetic valve 10 can be initially crimped around the balloon 114 during the delivery. Before deploying the prosthetic valve 10, the balloon 114 can be moved out of the prosthetic valve 10 so that the balloon 114 can be radially expanded independent of the prosthetic valve 10, as described more fully below. In still alternative embodiments, the balloon 114 can be positioned at a location along the second shaft 104 (or the inner shaft 102) such that the radially compressed prosthetic valve 10 can be positioned distal to the balloon 114 in the delivery configuration.

The second shaft 104 can have an inflation lumen that is fluidly connectable to a source of an inflation fluid (e.g., a syringe), which can be coupled to the handle 110 of the delivery apparatus 101. Thus, the balloon 114 can be inflated to an expanded state by injecting a volume of fluid (e.g., a liquid, such as saline, or a gas) through the inflation lumen into the balloon 114. In addition, the balloon 114 can be deflated by withdrawing the fluid from the balloon 114 through the inflation lumen back into a reservoir of the source of the inflation fluid.

The delivery apparatus 101 can also include a valve-retaining device 116 that is releasably connected to the prosthetic valve 10. In the depicted embodiment, the valve-retaining device 116 is positioned proximal to the prosthetic valve 10, and the balloon 114 is positioned distal to the prosthetic valve 10. In the illustrated embodiment, the valve-retaining device 116 can include one or more radially expandable support members 130 releasably connected to the prosthetic valve 10.

In some embodiments, each of the support members 130 can be releasably connected to the prosthetic valve 10 via a plurality of coupling members 26 mounted on the frame 12 of the prosthetic valve 10. The distal end portion of each support member 130 can be configured to form a releasable attachment with a corresponding coupling member 26. For example, in some implementations, the distal end portion of each support member 130 can be screwed into a threaded opening of a corresponding coupling member 26. After expansion of the prosthetic valve 10 at the deployment site, the user can de-couple the support members 130 from the respective coupling members 26 (e.g., unscrew the support members 130 from the coupling members 26) or actuate one or more release members that cause the support members 130 to de-couple from the coupling members 26. In some embodiments, the coupling members 26 can further incorporate locking mechanisms that are configured to retain the prosthetic valve 10 in the radially expanded configuration. Further details regarding the construction of mechanisms that can be used to form a releasable connection between the valve-retaining device 116 and the prosthetic valve 10 and locking mechanisms are disclosed in U.S. Patent Application Publication Nos. U.S. 2018/0153689, U.S. 2018/0344456, and U.S. 2019/0060057, and U.S. Provisional Application No. 62/869,948, filed Jul. 2, 2019, which are incorporated herein by reference.

In some embodiments, at least a distal portion of the support members 130 can be radially compressible and expandable. For example, during the delivery of the prosthetic valve 10, the support members 130, which are connected to the crimped prosthetic valve 10, can be radially compressed and stowed within the distal end portion 108d of the outer sheath 108. Before expanding the prosthetic valve 10, the outer sheath 108 can be retracted from the prosthetic valve 10 and the distal portions of the support members 130. When the prosthetic valve 10 is expanded by urging it against the balloon 114, as described below, the distal portions of the support members 130 can also expand radially so as to maintain their connection with the expanded prosthetic valve 10.

In some embodiments, as illustrated in FIGS. 3-7, a proximal end of each of the support members 130 can be fixedly connected to a hub 122, which can be coupled to the distal end of the third shaft 106, which can function as a pusher member to push the prosthetic valve 10 distally relative to the outer sheath 108 and the balloon 114. In alternative embodiments, the support members 130 need not be connected to a common hub 122 and/or shaft 106. Instead, each of the support members 130 can extend proximally through the sheath 108 to the handle 110 (in which case the shaft 106 and the hub 122 can be excluded). Having each support member 130 extend proximally to the handle 110 allows a user to control movement (axial and/or rotational movement) of an individual support member relative to the others. For example, in some implementations, each support member 130 can be rotated relative to the others, which can allow a user to unscrew and remove each support member from its corresponding coupling member 26 on the prosthetic valve 10.

When the balloon 114 is in the radially compressed state (see, e.g., FIG. 4), the largest outer diameter of the balloon 114 can be smaller than or about the same as the outer diameter of the prosthetic valve 10 when it is in the radially compressed configuration. On the other hand, when inflated, at least a portion of the balloon 114 can have an outer diameter that is larger than the outer diameter of the prosthetic valve 10 when the prosthetic valve 10 is radially expanded (see, e.g., FIG. 6). When the prosthetic valve 10 is urged against the inflated balloon 114, the opposing axial forces against the distal and proximal ends 14, 16 of the prosthetic valve 10 causes the prosthetic valve 10 to foreshorten axially and expand radially.

In the depicted embodiment, the balloon 114 and the prosthetic valve 10 can be axially moveable relative to each other. For example, as noted above, the second shaft 104 can be configured to be axially moveable relative to the shaft 106. Thus, after the balloon 114 is inflated, moving the second shaft 104 in the proximal direction pulls the balloon 114 proximally until the inflated balloon 114 contacts and urges against the distal end 14 of the prosthetic valve 10 (see, e.g., FIG. 6).

In other embodiments (not shown), the balloon 114 can be fixedly coupled to the nose cone 112. Thus, in such embodiments, the inflated balloon 114 can be moved proximally and urged against the prosthetic valve 10 by retracting the inner shaft 102 in the proximal direction.

Meanwhile, the proximal end 16 of the prosthetic valve 10 can be held at a fixed position relative to the surrounding anatomy and the handle 110. This can be achieved, for example, by applying a counter force against the proximal end of the shaft 106 so that the shaft 106 and the valve-retaining device 116 remain in place relative to the surrounding anatomy and the handle 110. In this manner, the prosthetic valve 10 is axially compressed and radial expanded by virtue of the opposed axial forces applied against the opposite ends of the frame 12.

Because the axial compression force is applied to both the proximal end 16 (by the valve-retaining device 116) and the distal end 14 (by the inflated balloon 114) of the prosthetic valve 10, the expansion mechanism described above is mechanically advantageous. Specifically, mechanical work (W) applied to the prosthetic valve 10 is the product of the applied force (F) and the traveled distance (d), i.e., $W = F \times d$. Thus, utilizing the entire axial length of the prosthetic valve 10 for axial compression can result in minimal force required for radial expansion of the prosthetic valve 10.

In some embodiments, instead of moving the inflated balloon 114 proximally, the prosthetic valve 10 can be moved distally until it contacts and is urged against the inflated balloon 114. This can be achieved, for example, by moving the shaft 106 (and the hub 122 and valve-retaining device 116) in the distal direction relative to the shaft 104 and the balloon 114. By holding the inflated balloon 114 at a fixed location relative to the surrounding anatomy and the handle 110 and moving the prosthetic valve 10 distally against the inflated balloon 114, the prosthetic valve 10 can be compressed in the axial direction to cause radial expansion.

In other embodiments, both the inflated balloon 114 and the prosthetic valve 10 can move axially relative to each other to produce radial expansion of the prosthetic valve 10. For example, the inflated balloon 114 can be moved proximally relative to the shaft 106 and the prosthetic valve 10 by retracting the shaft 104 in the proximal direction, and the prosthetic valve 10 can be moved distally relative to the shaft 104 and the balloon 114 by pushing the shaft 106 in the distal direction. As such, the prosthetic valve 10 can be radially expanded by proximal movement of the balloon 114 and the distal movement of the prosthetic valve 10.

Thus, the delivery apparatus 101 shown in FIGS. 3-7 provides a novel method of implanting the prosthetic valve 10. As noted above, the prosthetic valve 10 can be mounted in a radially compressed configuration along the distal end portion of the delivery apparatus 101, as shown in FIG. 3. The delivery apparatus 101 (along with the prosthetic valve 10) can then be inserted into the patient's vasculature and advanced to the target implantation site. For example, if implanting the prosthetic valve within or adjacent the native aortic valve, the delivery apparatus 101 (along with the prosthetic valve 10) can be inserted into a femoral artery, and then advanced through the femoral artery, the aorta and into the heart.

After advancing the prosthetic valve 10 to the target implantation site (e.g., within or adjacent the native aortic valve), the sheath 108 can be retracted to expose the balloon 114 and the prosthetic valve 10, as shown in FIG. 4. The balloon 114 can then be inflated (FIG. 5) and then urged against the prosthetic valve 10 to apply an axially directed force against one end of the prosthetic valve 10 (FIG. 6), e.g., by moving the inflated balloon 114 axially toward the prosthetic valve 10 and/or moving the prosthetic valve 10 axially toward the inflated balloon 114, thereby radially expanded the prosthetic valve 10 into contact with surrounding tissue (e.g., the native aortic valve).

After the prosthetic valve 10 is radially expanded, the prosthetic valve 10 can be locked in the expanded configuration by applying a locking mechanism (not shown). One or more locking mechanisms, such as screws, ratchets, etc., can be employed to lock or retain the prosthetic valve 10 in the radially expanded configuration, as previously described in U.S. Patent Application Publication Nos. U.S. 2018/0153689, U.S. 2018/0344456, and U.S. 2019/0060057, and U.S. Provisional Application No. 62/869,948.

Following valve expansion and locking, the balloon 114 can be deflated, as illustrated in FIG. 7. The expanded prosthetic valve 10 can be disconnected from the valve-retaining device 116, e.g., by actuating one or more release members that cause the support members 130 to de-couple from the respective coupling members 26, thereby releasing the support members 130 from the prosthetic valve 10. Thus, the prosthetic valve 10 can be retained at the target location, and the delivery apparatus 101 can be removed from the patient's vasculature.

FIG. 8-12 illustrate another embodiment of a prosthetic valve delivery assembly 200 and a related method of expanding the prosthetic valve 10. As shown, the delivery assembly 200 includes a delivery apparatus 201 and the prosthetic valve 10. The prosthetic valve 10 can be mounted in a radially compressed configuration around a distal end portion of the delivery apparatus 201 for insertion into a patient's body. In some embodiments, the prosthetic valve 10 can be oriented so that the outflow end 16 is positioned proximally relative to the inflow end 14 so that the prosthetic valve 10 can be advanced through the patient's vasculature in a retrograde approach (e.g., through a femoral artery and the aorta) to the heart for implantation at the native aortic valve. In other embodiments, the prosthetic valve 10 can be oriented so that the inflow end 14 is positioned proximally relative to the outflow end 16, depending on the particular delivery approach used and the implantation location for the prosthetic valve 10.

The delivery apparatus 201 in the illustrated embodiment includes a first shaft 202, a second shaft 204 extending co-axially over the first shaft 204, a third shaft 206 extending co-axially over the second shaft 204, and a fourth shaft 208 extending co-axially over the third shaft 206. The first shaft 202 is the inner-most shaft in the illustrated embodiment and can be referred to as the inner shaft of the delivery apparatus 201. The fourth shaft 208 is the outer-most shaft in the illustrated embodiment and can be referred to as the outer shaft or outer sheath of the delivery apparatus 201. The shafts 202, 204, 206, and 208 can be axially and/or rotationally moveable relative to each other using one or more actuators or knobs on a handle of the delivery apparatus, as described above in connection with delivery apparatus 101.

The delivery apparatus 201 can include a nose cone 212 connected to a distal end of the inner shaft 202. A guide wire (not shown) can extend through a central lumen of the inner shaft 202 and an inner lumen of the nose cone 212, so that the delivery apparatus 201 can be advanced over the guide wire inside the patient's vasculature. The proximal ends of the shafts 202, 204, 206, and 208 can be coupled to a handle (not shown), which can be maneuvered by a surgeon to advance and retract the delivery apparatus 201 through the patient's vasculature and/or control different components of the delivery assembly 200 in order to expand and/or deploy the prosthetic valve 10, as described above in connection with delivery apparatus 101.

Figure 8:
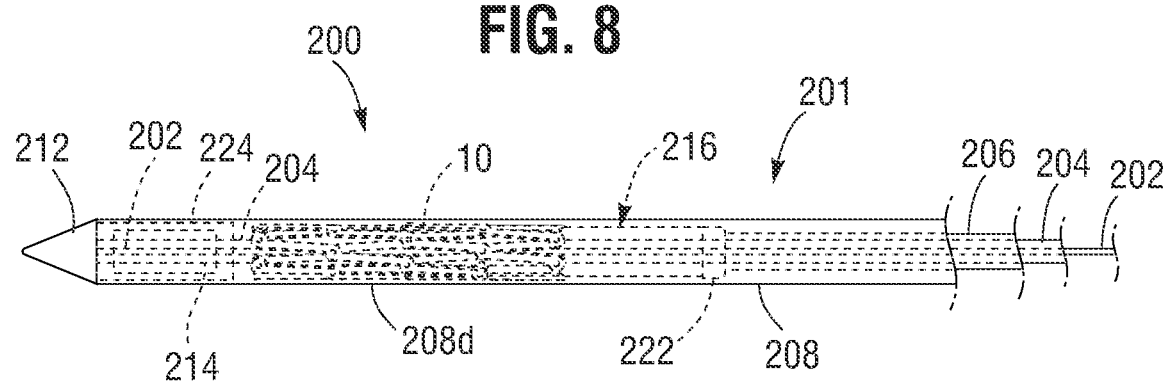
FIG. 8 shows a side elevation view of a prosthetic valve delivery assembly including an expansion assist device and a compressed prosthetic valve, according to another embodiment, wherein the expansion assist device includes a plurality of self-expandable arms stowed in a cover sheath.

As shown in FIG. 8, a distal end portion 208*d* of the outer sheath 208 can extend over the crimped prosthetic valve 10 and contact the nose cone 212 in the delivery configuration of the delivery apparatus 201. Thus, the distal end portion 208*d* of the outer sheath 208 can serve as a delivery capsule that contains or houses the prosthetic valve 10 in the radially compressed configuration for delivery through the patient's vasculature. The outer sheath 208 and the inner shaft 202 can be configured to be axially moveable relative to each other such that proximal movement of the outer sheath 208 relative to the inner shaft 202 or a distal movement of the inner shaft 202 relative to the outer sheath 208 can expose the prosthetic valve 10 from the outer sheath 208. In alternative embodiments, the prosthetic valve 10 need not be housed within the outer sheath 208 during delivery. As such, in some embodiments, the delivery apparatus 201 does not include the outer sheath 208.

The delivery apparatus 201 can further include an expansion assist device that can be used to expand the prosthetic valve 10. The expansion assist device can be radially expandable and compressible between a radially compressed state and a radially expanded state. Further, the expansion and compression of the expansion assist device can be independent of the expansion and compression of the prosthetic valve 10. The expansion assist device desirably is unconnected to the prosthetic valve to facilitate independent expansion of the expansion assist device relative to the prosthetic valve.

In the depicted embodiment, the expansion assist device comprises a self-expandable body 214 that is retained in a radially compressed state during delivery and can self-expand to a radially expanded state when deployed from a sheath or other type of restraint that retains the body 214 in the radially compressed state. The body 214 can be formed from a shape-memory material, such as Nitinol. The body 214 in the illustrated embodiment comprises a central hub 216 and one or more self-expandable arms 218. The delivery apparatus 201 can further include a cover sheath 224 configured to extend over the self-expandable arms 218 so as to stow the self-expandable arms 218 in a compressed state during delivery (see, e.g., FIGS. 8-9). In particular embodiments, the body 214 comprises two self-expandable arms 218, although the body 214 can comprises three, four, five or more self-expandable arms 218 in alternative embodiments.

In the illustrated embodiment, the sheath 224 extends proximally from the nose cone 212. The sheath 224 can be formed integrally with the nose cone 212 or can be fixedly secured to the proximal end of the nose cone 212. The nose cone 212 and the sheath 224 together form a distal tip portion that is secured to the distal end portion of the inner shaft 202. Thus, distal and proximal movement of the inner shaft 202 causes corresponding movement of the distal tip portion. In other embodiments, the sheath 224 can be mounted on a shaft separate from the nose cone 212 and can be moveable relative thereto.

The body 214 of the expansion assist device can be coupled to or carried by the shaft 204 such that proximal and distal movement of the shaft 204 causes corresponding proximal and distal movement of the body 214. For example, the hub 216 in the illustrated embodiment is integrally formed with the distal end portion of the shaft 204. However, in other embodiments, the hub 214 can be connected to a distal end of the shaft 204 or mounted co-axially around a distal end portion of the shaft 204. Since the self-expandable body 214 and the nose cone 212 are connected to separate shafts, the cover sheath 224 (together with the nose cone 212) and the self-expandable body 214 can be moved axially relative to each other during the implantation procedure.

The distal end portion 208d of the outer sheath 208 can also extend over the cover sheath 224 (which stows the self-expandable body 214) in the delivery configuration of the delivery apparatus 201. In the embodiment depicted in FIG. 8, the radially compressed prosthetic valve 10 is mounted around the shaft 204 and the self-expandable body 214 (stowed within the cover sheath 224) is positioned distal to the prosthetic valve 10 in the delivery configuration. As further shown in FIG. 8, the radially compressed prosthetic valve 10 can be axially spaced from the adjacent end of the cover sheath 224 when the delivery apparatus 201 is in the delivery configuration.

In other embodiments (not shown), the prosthetic valve 10 can be initially crimped around the cover sheath 224 (which stows the self-expandable body 214) during the delivery. In such embodiments, before deploying the prosthetic valve 10, the cover sheath 224 (together with the stowed self-expandable body 214) can be moved out of the prosthetic valve 10 so that the self-expandable arms 2018 can self-expand independent of the prosthetic valve 10, as described more fully below. In still alternative embodiments, the self-expandable body 214 and the cover sheath 224 can be positioned at a location proximal to the crimped prosthetic valve 10 in the delivery configuration.

Similar to the delivery apparatus 101, the delivery apparatus 201 can include a valve-retaining device 216 that is positioned proximal to the prosthetic valve 10. In the depicted embodiment, the valve-retaining device 216 can include one or more radially expandable support members 230 releasably connected to the prosthetic valve 10. For example, the distal end portion of each support member 230 can be configured to form a releasable attachment with a corresponding coupling member 26 mounted on the frame of the prosthetic valve 10. Similar to the support members 130, at least a distal portion of the support members 230 can be radially compressible and expandable.

In some embodiments, as illustrated in FIGS. 8-12, a proximal end of each of the support members 230 can be fixedly connected to a hub 222, which can be coupled to the distal end portion of the third shaft 206, which can function as a pusher member to push the prosthetic valve 10 distally relative to the outer sheath 208 and the cover sheath 224. In alternative embodiments, the support members 230 need not be connected to a common hub 222 and/or shaft 206. Instead, each of the support members 230 can extend proximally through the sheath 208 to the handle (not shown) for the user to control.

The self-expandable body 214 and the cover sheath 224 can be axially moveable relative to each other. For example, as noted above, the second shaft 204 can be configured to be axially moveable relative to the inner shaft 202. Thus, moving the second shaft 204 in the proximal direction and/or moving the first shaft 202 in the distal direction can expose at least the proximal end portions of the self-expandable arms 218 outside the cover sheath 224, thereby allowing the exposed portions of the self-expandable arms 218 to radially self-expand to an expanded state (see, e.g. FIG. 10).

Figure 11:
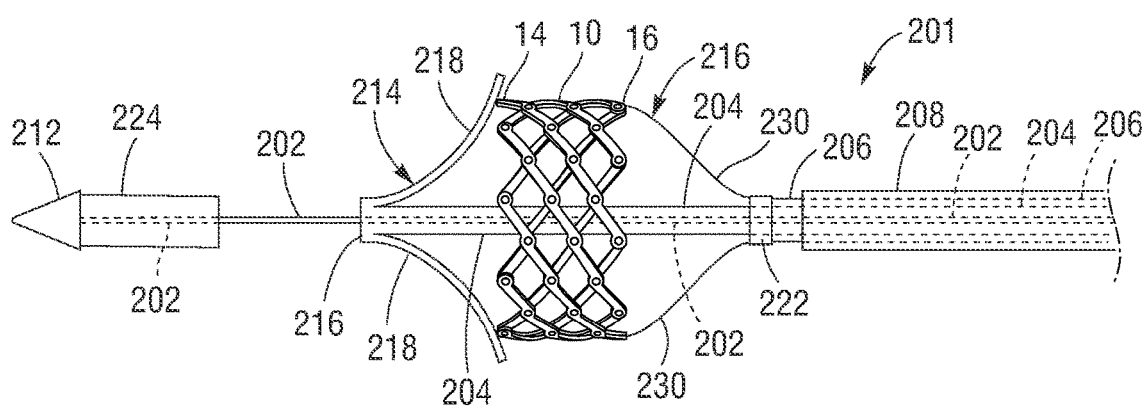
FIG. 11 shows the prosthetic valve delivery assembly depicted in FIG. 8 after the expanded expansion assist device is urged against the prosthetic valve, causing the prosthetic valve to radially expand.

In some embodiments, the outer diameter of the cover sheath 224 can be smaller than or about the same as the outer diameter of the prosthetic valve 10 when it is in the radially compressed configuration. On the other hand, when self-expanded outside of the cover sheath 224, the expanded arms 218 can have an outer diameter that is larger than the outer diameter of the prosthetic valve 10 when the prosthetic valve 10 is radially expanded (see, e.g., FIG. 11). As shown in FIG. 11, in the illustrated embodiment, the proximal ends of the arms 218 define an outer diameter that is greater than the diameter of the valve in the radially expanded configuration. Thus, when the prosthetic valve 10 is urged against the expanded arms 218, the opposing axial forces against the distal and proximal ends 14, 16 of the prosthetic valve 10 causes the prosthetic valve 10 to foreshorten axially and expand radially.

In the depicted embodiment, the self-expandable arms 218 and the prosthetic valve 10 can be axially moveable relative to each other. For example, after the arms 218 are expanded, retracting the second shaft 204 in the proximal direction relative to the shaft 206 can move the expanded arms 218 proximally relative to the prosthetic valve 10 so that they contact and urge against the distal end 14 of the prosthetic valve 10.

Meanwhile, the proximal end 16 of the prosthetic valve 10 can be held at a fixed position relative to the surrounding anatomy and the handle, for example, by applying a counter force against the proximal end of the shaft 206 so that the shaft 206 and the valve-retaining device 216 retain in place relative to the surrounding anatomy and the handle. Accordingly, the prosthetic valve 10 can be axially compressed to cause radial expansion by virtue of the opposing axial forces at the opposite ends of the valve 10.

In some embodiments, instead of moving the expanded arms 218 proximally, the prosthetic valve 10 can be moved distally until it contacts and is urged against the expanded arms 218. This can be achieved, for example, by moving the shaft 206 (and the hub 222 and valve-retaining device 216) in the distal direction relative to the shaft 204. By holding the expanded arms 218 at a fixed location relative to the surrounding anatomy and moving the prosthetic valve 10 distally against the expanded arms 218, the prosthetic valve 10 can be compressed in the axial direction and radially expanded.

In other embodiments, both the expanded arms 218 and the prosthetic valve 10 can be moved axially relative to each other to produce radial expansion of the prosthetic valve 10. For example, the expanded arms 218 can be moved proximally relative to the prosthetic valve 10 by retracting the shaft 204 in the proximal direction, and the prosthetic valve 10 can be moved distally relative to the expanded arms 218 by pushing the shaft 206 in the distal direction. As such, the prosthetic valve 10 can be radially expanded by proximal movement of the expanded arms 218 and distal movement of the prosthetic valve 10.

As previously described in connection with delivering the valve 10 using the delivery apparatus 101, after the prosthetic valve 10 is radially expanded, the prosthetic valve 10 can be locked in the expanded configuration by actuating a locking mechanism (not shown). Following valve expansion and locking, the arms 218 and the prosthetic valve 10 can be separated, for example, by pushing the second shaft 204 in the distal direction relative to the shaft 206. Alternatively, the arms 218 and the prosthetic valve 10 can be separated by retracting the shaft 206 in the proximal direction relative to the shaft 204.

Following valve expansion and locking, the expanded arms 218 can be recaptured back into the cover sheath 224 (see, e.g., FIG. 12). For example, the cover sheath 224 can be moved proximally relative to the arms 218 by retracting the inner shaft 202 in the proximal direction while the self-expandable arms 218 are held in a fixed location relative to the surrounding anatomy and the handle by applying a counter force to the proximal end of the second shaft 204. As such, the cover sheath 224 can slide over and recapture the self-expandable arms 218.

In other embodiments, the expanded arms 218 can be inserted back into the cover sheath 224 by pushing the second shaft 204 in the distal direction relative to the inner shaft 202 and the cover sheath 224 while holding the inner shaft 202 and the cover sheath 224 fixed in location relative to the surrounding anatomy and the handle. Alternatively, the expanded arms 218 can be recaptured by the cover sheath 224 by simultaneously pushing the second shaft 204 in the distal direction and pulling the inner shaft 202 in the proximal direction.

Figure 9:
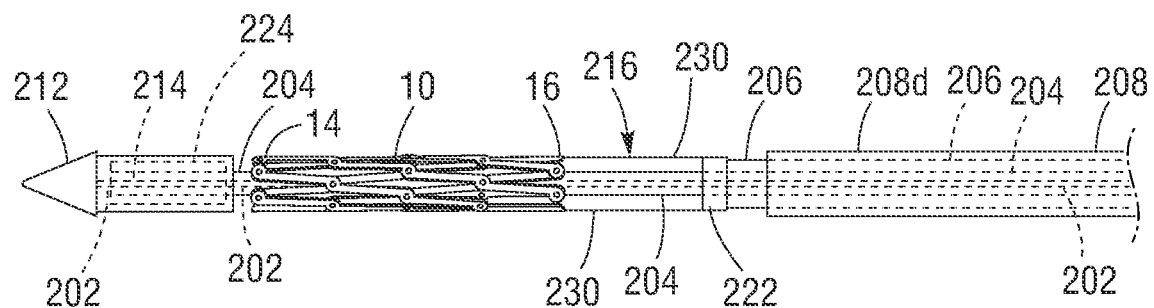
FIG. 9 shows the prosthetic valve delivery assembly depicted in FIG. 8 after the expansion assist device and the prosthetic valve have been advanced from the outer sheath.
Figure 10:
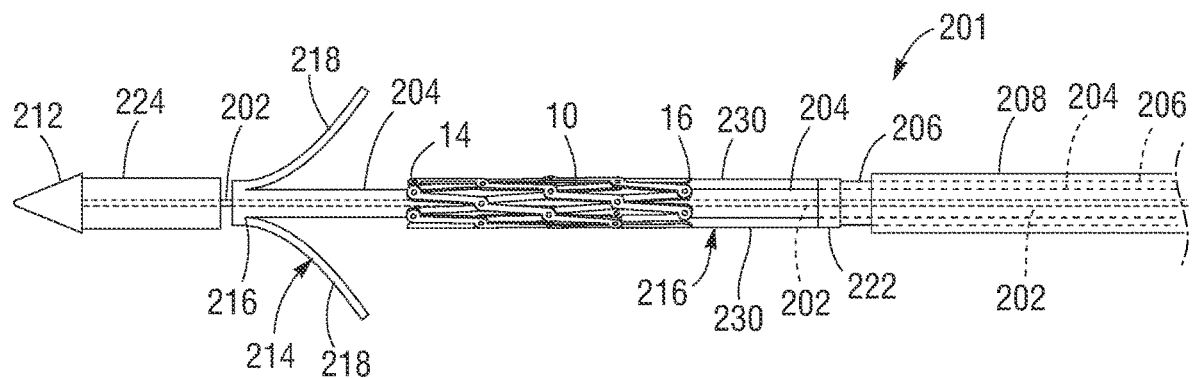
FIG. 10 shows the prosthetic valve delivery assembly depicted in FIG. 8 after the expansion assist device is removed from an inner cover sheath and allowed to self-expand to an expanded configuration.

Thus, the delivery apparatus 201 shown in FIGS. 8-12 provides another novel method of implanting the prosthetic valve 10. As noted above, the prosthetic valve 10 can be mounted in a radially compressed configuration along the distal end portion of the delivery apparatus 201. The delivery apparatus 201 (along with the prosthetic valve 10) can be inserted into the patient and advanced through patient's vasculature to the target implantation site, as previously described. At or adjacent the implantation site, the outer sheath 208 can be retracted to expose the prosthetic valve 10 and the inner cover sheath 224, as shown in FIG. 9. The self-expandable body 214 can then be deployed from the cover sheath 224 to allow the arms 218 to self-expand, as shown in FIG. 10. Then the expanded arms 218 can be urged against the prosthetic valve 10 to apply an axially directed force against one end of the prosthetic valve 10 (FIG. 11), e.g., by moving the expanded arms 218 axially toward the prosthetic valve 10 and/or moving the prosthetic valve 10 axially toward the expanded arms 218, thereby radially expanded the prosthetic valve 10 into contact with surrounding tissue.

As noted above, after the prosthetic valve 10 is radially expanded, the prosthetic valve 10 can be locked in the expanded configuration. Then the self-expandable arms 218 can be recaptured back into the cover sheath 224 (FIG. 12), and the expanded prosthetic valve 10 can be disconnected from the valve-retaining device 216, e.g., by actuating one or more release members that cause the support members 230 to de-couple from the respective coupling members 26, thereby releasing the support members 230 from the prosthetic valve 10. Thus, the prosthetic valve 10 can be retained at the target location, and the delivery apparatus 201 can be removed from the patient's vasculature.

In the embodiments shown in FIGS. 3-12, the valve-retaining device 130 or 230 is positioned proximal to the prosthetic valve 10, and the expansion assist device 114 or 214 is positioned distal to the prosthetic valve 10. In other embodiments, the positions of the valve-retaining device and the expansion assist device can be varied while the same principle can be applied to expand the prosthetic valve 10.

For example, in certain embodiments (not shown), a valve-retaining device can be positioned distal to the prosthetic valve, and an expansion assist device (e.g., an inflatable balloon or one or more self-expandable arms stowed within a cover sheath) can be positioned proximal to the prosthetic valve. The valve-retaining device can be releasably connected to the distal end of the prosthetic valve, and the expansion assist device can be radially expanded (e.g., when self-expandable arms are used, the distal portions of the arms are exposed outside the cover sheath and expand so that the expanded arms are adjacent to the proximal end of the prosthetic valve). Thus, after expanding the expansion assist device, pushing the expansion assist device distally relative to the prosthetic valve and/or retracting the prosthetic valve proximally relative to the expansion assist device can cause the expansion assist device to urge against the proximal end of the prosthetic valve. In this manner, the prosthetic valve can be axially compressed and radially expanded.

Yet in alternative embodiments (not shown), a valve-retaining device and an expansion assist device can be positioned at the same side of the prosthetic valve. For example, an expansion assist device can be positioned proximal to the prosthetic valve, and a valve-retaining device can be positioned proximal to the expansion assist device. In other words, the expansion assist device can be positioned between the prosthetic valve and the valve-retaining device. In certain embodiments, the valve-retaining device can have one or more support members that bypass or extend through the expansion assist device and are releasably connected to the prosthetic valve. Thus, after expanding the expansion assist device, retracting the valve-retaining device in the proximal direction can move the prosthetic valve proximally and cause the proximal end of the prosthetic valve to be urged against the expanded expansion assist device. Accordingly, the prosthetic valve can be radially expanded by holding the expansion assist device in a fixed location while retracting the valve-retaining device in the proximal direction, or alternatively, by holding the valve-retaining device in a fixed location while pushing the expansion assist device in the distal direction. The same principle can also apply when both the valve-retaining device and the expansion assist device are positioned distal to the prosthetic valve.

GENERAL CONSIDERATIONS

It should be understood that the disclosed embodiments can be adapted to deliver and implant prosthetic devices in any of the native annuluses of the heart (e.g., the pulmonary, mitral, and tricuspid annuluses), and can be used with any of various delivery approaches (e.g., retrograde, antegrade, transseptal, transventricular, transatrial, etc.).

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples. In view of the many possible embodiments to which the principles of the disclosed technology may be applied, it should be recognized that the illustrated embodiments are only preferred examples and should not be taken as limiting the scope of the disclosed technology.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used herein, with reference to the prosthetic valve, the valve-retaining device, the expansion assist device and other components of the delivery assembly, "proximal" refers to a position, direction, or portion of a device that is closer to the handle of the delivery assembly that is outside the patient, while "distal" refers to a position, direction, or portion of a device that is further away from the handle. The terms "longitudinal" and "axial" refer to an axis extending in the proximal and distal directions, unless otherwise expressly defined.

As used in this application and in the claims, the singular forms "a," "an," and "the" include the plural forms unless the context clearly dictates otherwise. Additionally, the term "includes" means "comprises." Further, the terms "coupled" and "connected" generally mean electrically, electromagnetically, and/or physically (e.g., mechanically or chemically) coupled or linked and does not exclude the presence of intermediate elements between the coupled or associated items absent specific contrary language.

Directions and other relative references (e.g., inner, outer, upper, lower, etc.) may be used to facilitate discussion of the drawings and principles herein, but are not intended to be limiting. For example, certain terms may be used such as "inside," "outside,", "top," "down," "interior," "exterior," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same. As used herein, "and/or" means "and" or "or," as well as "and" and "or."

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A prosthetic valve delivery assembly comprising:
a delivery apparatus comprising a shaft;
a prosthetic valve mounted in a radially compressed configuration around a distal portion of the shaft; and
the delivery apparatus further comprising an expansion assist device mounted on the shaft;
wherein the expansion assist device is independently radially expandable and compressible relative to the prosthetic valve between a radially compressed state and a radially expanded state;
wherein the prosthetic valve is radially expandable by applying an axially directed force against the prosthetic valve in a proximal or distal direction through contact between the prosthetic valve and the expansion assist device when the expansion assist device is in the radially expanded state,
wherein when the expansion assist device is in the radially expanded state and axially spaced apart from the prosthetic valve, at least a portion of the expansion assist device has a diameter that is larger than a diameter of the prosthetic valve when the prosthetic valve is radially expanded.

2. The assembly of claim 1, wherein the delivery apparatus further comprises a valve-retaining device releasably connected to the prosthetic valve.

3. The assembly of claim 2, wherein the valve-retaining device is positioned proximal to the prosthetic valve, and the expansion assist device is positioned distal to the prosthetic valve.

4. The assembly of claim 2, wherein the valve-retaining device comprises one or more radially expandable support members releasably connected to a proximal end of the prosthetic valve.

5. The assembly of claim 1, wherein the expansion assist device comprises an inflatable balloon mounted on the shaft.

6. The assembly of claim 1, wherein the expansion assist device comprises one or more self-expandable arms.

7. The assembly of claim 6, wherein the delivery apparatus comprises a cover sheath configured to extend over the one or more self-expandable arms so as to stow the one or more self-expandable arms in a compressed configuration.

8. The assembly of claim 7, where the cover sheath is axially moveable relative to the one or more self-expandable arms such that moving the cover sheath distally relative to the arms causes at least a proximal portion of each arm to extend outside the cover sheath and self-expand to an expanded configuration.

9. The assembly of claim 2, wherein when the expansion assist device is in the radially expanded state, moving the expansion assist device proximally causes the expansion assist device to be urged against a distal end of the prosthetic valve to produce radial expansion of the prosthetic valve.

10. The assembly of claim 2, wherein the valve-retaining device is axially moveable relative to the shaft, and moving the valve-retaining device distally while the expansion assist device is in the radially expanded state pushes the prosthetic valve distally against the expansion assist device to produce radial expansion of the prosthetic valve.

11. A prosthetic valve delivery assembly comprising:
a delivery apparatus comprising a shaft;
a prosthetic valve mounted in a radially compressed configuration around a distal portion of the shaft;
the delivery apparatus further comprising an expansion assist device mounted on the shaft, the expansion assist device being unconnected to the prosthetic valve;
wherein the expansion assist device and the prosthetic valve are axially moveable relative to each other;
wherein the expansion assist device is radially expandable and compressible between a radially compressed state and a radially expanded state;
wherein the prosthetic valve is radially expandable by applying an axially directed force against the prosthetic valve in a proximal or distal direction through contact between the prosthetic valve and the expansion assist device when the expansion assist device is in the radially expanded state,
wherein when the expansion assist device is in the radially expanded state and axially spaced apart from the prosthetic valve, at least a portion of the expansion assist device has a diameter that is larger than a diameter of the prosthetic valve when the prosthetic valve is radially expanded.

12. The assembly of claim 11, wherein the expansion and compression of the expansion assist device are independent of the expansion and compression of the prosthetic valve.

13. The assembly of claim 11, wherein the delivery apparatus further comprises a valve-retaining device releasably connected to the prosthetic valve.

14. The assembly of claim 13, wherein the valve-retaining device is positioned proximal to the prosthetic valve, and the expansion assist device is positioned distal to the prosthetic valve.

15. The assembly of claim 13, wherein the valve-retaining device is positioned distal to the prosthetic valve, and the expansion assist device is positioned proximal to the prosthetic valve.

16. The assembly of claim 11, wherein the expansion assist device comprises an inflatable balloon mounted on the shaft.

17. The assembly of claim 11, wherein the expansion assist device comprises one or more self-expandable arms.

18. The assembly of claim 17, wherein the expansion assist device comprises a cover sheath configured to extend over the one or more self-expandable arms so as to stow the one or more self-expandable arms in a compressed configuration.

19. The assembly of claim 18, where the cover sheath is axially moveable relative to the one or more self-expandable arms such that moving the cover sheath axially relative to the arms causes at least a portion of each of the arms to extend outside the cover sheath and self-expand to an expanded configuration.

20. A method of expanding a prosthetic valve mounted in a radially compressed configuration around a shaft of a delivery apparatus, the method comprising:
expanding an expansion assist device mounted on the shaft from a radially compressed state to a radially expanded state; and
after expanding the expansion assist device, applying an axial force against the prosthetic valve in a proximal or distal direction through contact between the prosthetic valve and the expanded expansion assist device, thereby causing the prosthetic valve to radially expand from the radially compressed configuration to a radially expanded configuration,
wherein the expansion assist device is initially axially spaced from the prosthetic valve and the method further comprises the act of bringing the expansion assist device into contact with the prosthetic valve after the act of expanding the expansion assist device.

21. The method of claim 20, wherein the act of bringing the expansion assist device into contact with the prosthetic valve comprises moving the prosthetic device axially toward the expansion assist device.

22. The method of claim 20, wherein the act of bringing the expansion assist device into contact with the prosthetic valve comprises moving the expansion assist device axially toward the prosthetic device.

23. The method of claim 20, wherein the expansion assist device comprises an inflatable balloon, and the act of expanding the expansion assist device comprises inflating the inflatable balloon.

24. The method of claim 20, wherein the expansion assist device comprises one or more self-expandable arms, and the act of expanding the expansion assist device comprises deploying at least a portion of each arm from a sheath so as to allow the portion of each arm to self-expand.

25. The method of claim 20, wherein the act of applying an axial force against the prosthetic valve comprises moving the expanded expansion assist device in a proximal direction against a distal end of the prosthetic valve.

26. A method of expanding a prosthetic valve mounted in a radially compressed configuration around a shaft of a delivery apparatus, the method comprising:
expanding an expansion assist device mounted on the shaft from a radially compressed state to a radially expanded state; and
after expanding the expansion assist device, applying an axial force against the prosthetic valve in a proximal or distal direction through contact between the prosthetic valve and the expanded expansion assist device, thereby causing the prosthetic valve to radially expand from the radially compressed configuration to a radially expanded configuration,
wherein the act of applying an axial force against the prosthetic valve comprises moving a valve-retaining device connected to a proximal end of the prosthetic valve in a distal direction against the expanded expansion assist device.

* * * * *